US010701630B2

United States Patent
Vyas et al.

(10) Patent No.: US 10,701,630 B2
(45) Date of Patent: Jun. 30, 2020

(54) REDUCING POWER CONSUMPTION IN WIRELESS STATIONS PROVIDING NETWORK CONNECTIVITY FOR EMBEDDED DEVICES

(71) Applicant: GainSpan Corporation, San Jose, CA (US)

(72) Inventors: Pankaj Vyas, Bangalore (IN); Vishal Batra, Bangalore (IN)

(73) Assignee: GainSpan Corporation, San Jose, CA (US)

( * ) Notice: Subject to any disclaimer, the term of this patent is extended or adjusted under 35 U.S.C. 154(b) by 451 days.

(21) Appl. No.: 14/522,601

(22) Filed: Oct. 24, 2014

(65) Prior Publication Data

US 2016/0119869 A1    Apr. 28, 2016

(51) Int. Cl.
*H04L 1/00*    (2006.01)
*H04W 52/02*    (2009.01)
(Continued)

(52) U.S. Cl.
CPC ....... *H04W 52/0209* (2013.01); *H04L 1/0053* (2013.01); *H04L 47/29* (2013.01); *H04L 47/30* (2013.01); *H04W 28/08* (2013.01); *H04W 28/14* (2013.01); *H04W 40/005* (2013.01); *H04L 47/12* (2013.01); *H04L 69/166* (2013.01);
(Continued)

(58) Field of Classification Search
CPC ................ H04W 28/14; H04W 40/005; H04L 49/9084; H04L 69/166; H04L 1/0053; H04N 21/433; H04N 21/26258
See application file for complete search history.

(56) References Cited

U.S. PATENT DOCUMENTS 5,220,437 A * 6/1993 Saegusa ............... H04N 1/0473
358/1.9
7,430,400 B2    9/2008 Russo et al.
(Continued)

OTHER PUBLICATIONS

Shengbo Chen, Tarun Bansal, Yin Sun, Prasun Sinha, Ness B. Shroff, Life-Add: Lifetime Adjustable Design for WiFi Networks with Heterogeneous Energy Supplies, http://newslab.ece.ohio-state.edu/research/resources/scheduling.pdf, date 2013, pp. 508-515.

*Primary Examiner* — Salvador E Rivas
(74) *Attorney, Agent, or Firm* — Pearl Cohen Zedek Latzer Baratz LLP (57) ABSTRACT

A system contains a wireless station connected to an embedded device by a wired path, with the wireless station being part of a wireless network. According to an aspect of the present disclosure, the wireless station places a receiver (communicating on the wireless network) in power savings mode upon occurrence of a first condition, and restores the receiver to active mode upon occurrence of a second condition. Such transitions between active and power savings modes are employed while receiving data units from a wireless network and providing the data units to the embedded device. In one embodiment, the first and second conditions correspond to a higher threshold and lower threshold for available data in the memory of the wireless station used for buffering not-yet-transferred data units. In alternative embodiments, the conditions are determined based on corresponding express indications by the embedded device.

9 Claims, 6 Drawing Sheets

(51) Int. Cl.
    *H04L 12/801*     (2013.01)
    *H04W 28/08*     (2009.01)
    *H04L 12/835*     (2013.01)
    *H04W 28/14*     (2009.01)
    *H04W 40/00*     (2009.01)
    *H04W 88/08*     (2009.01)
    *H04W 88/02*     (2009.01)
    *H04L 29/06*     (2006.01)

(52) U.S. Cl.
    CPC ............ *H04W 88/02* (2013.01); *H04W 88/08* (2013.01); *Y02D 70/142* (2018.01)

(56) References Cited

U.S. PATENT DOCUMENTS

| | | | |
|---|---|---|---|
| 8,190,200 B2 | 5/2012 | Conway et al. | |
| 8,364,080 B2 | 1/2013 | Desai et al. | |
| 8,565,112 B2 | 10/2013 | Peiris et al. | |
| 8,576,762 B2 | 11/2013 | Thomas et al. | |
| 8,583,190 B1* | 11/2013 | Kopikare | H04W 52/0251 455/574 |
| 2007/0104107 A1* | 5/2007 | Alapuranen | H04L 45/00 370/238 |
| 2008/0095097 A1 | 4/2008 | Mehta et al. | |
| 2008/0255692 A1* | 10/2008 | Hofrichter | H04L 12/2805 700/94 |
| 2011/0153928 A1* | 6/2011 | Avudaiyappan | G06F 1/3225 711/109 |
| 2013/0173079 A1* | 7/2013 | Taira | H04L 12/2829 700/296 |
| 2013/0279352 A1* | 10/2013 | Golan | H04L 12/4641 370/252 |
| 2014/0029535 A1 | 1/2014 | Medapalli | |
| 2014/0105084 A1 | 4/2014 | Chhabra et al. | |
| 2016/0119868 A1* | 4/2016 | Vyas | H04W 52/0209 370/311 |

\* cited by examiner

REDUCING POWER CONSUMPTION IN WIRELESS STATIONS PROVIDING NETWORK CONNECTIVITY FOR EMBEDDED DEVICES

RELATED APPLICATION

The present application is related to co-pending U.S. application entitled, "Reducing Power Consumption in Wireless Stations with Limited Memory", Ser. No. 14/522,600, filed on even date herewith, naming as Applicants: Pankaj Vyas and Vishal Batra.

BACKGROUND

Technical Field

Embodiments of the present disclosure relate generally to wireless stations, and more specifically reducing power consumption in wireless devices providing network connectivity for embedded devices.

Related Art

A wireless station refers to an end station of a wireless network. In one common scenario, wireless stations rely on access points as switching devices for transporting packets from one wireless station to another wireless station. Thus, wireless stations are the end points of (potentially multi-hop) communication based on wireless medium.

Embedded devices are a class of devices which are provided with limited capabilities in terms of memory and processing power. Embedded devices are contrasted with devices such as personal computers, cell phones, etc., which have substantially more memory/processing capabilities and provide suitable user interfaces for human users. Embedded devices find application in broad areas such as homes, offices, automobiles, etc., as is well known in the relevant arts.

Wireless devices often provide network connectivity for embedded devices. This implies that the embedded device in isolation does not have the capability to receive/transmit packets on wireless medium (which would require more processing power, etc.), but relies on a wireless device to provide such wireless network connectivity.

Aspects of the present disclosure are directed to reducing power consumption in wireless stations providing network connectivity for embedded devices.

BRIEF DESCRIPTION OF THE VIEWS OF DRAWINGS

Example embodiments of the present invention will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

A system contains a wireless station connected to an embedded device by a wired path, with the wireless station being part of a wireless network. According to an aspect of the present disclosure, the wireless station places a receiver (communicating on the wireless network) in power savings mode upon occurrence of a first condition, and restores the receiver to active mode upon occurrence of a second condition. Such transitions between active and power savings modes are employed while receiving data units from a wireless network and providing the data units to the embedded device.

In one embodiment, the first and second conditions correspond to a higher threshold and lower threshold for available data in the memory of the wireless station used for buffering not-yet-transferred data units.

In alternative embodiments, the conditions are determined based on corresponding express indications by the embedded device. In one such alternative embodiment, the embedded device provides corresponding express signals for transitioning to active and power-savings modes. In another alternative embodiment, the embedded device indicates the number of data units to be downloaded (from wireless network) in active mode before the wireless device can transition to power-savings modes. In yet another alternative embodiment, the embedded device indicates active and power-savings durations such that the receiver is placed in active state in active durations and power-savings state in power-savings durations.

Several aspects of the invention are described below with reference to examples for illustration. It should be understood that numerous specific details, relationships, and methods are set forth to provide a full understanding of the invention. One skilled in the relevant arts, however, will readily recognize that the invention can be practiced without one or more of the specific details, or with other methods, etc. In other instances, well-known structures or operations are not shown in detail to avoid obscuring the features of the invention.

2. Example Environment

Figure 1:
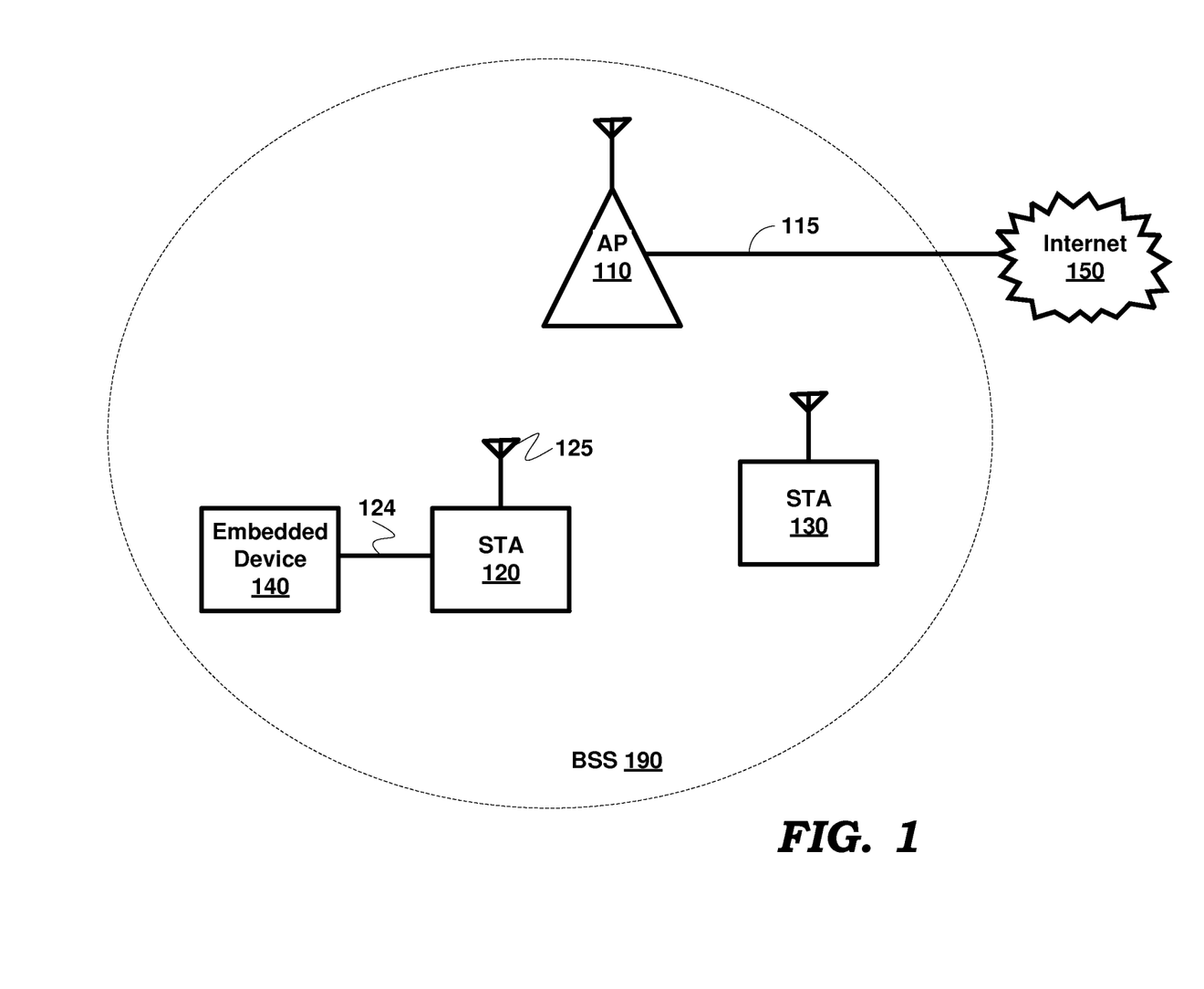
FIG. 1 is a block diagram of an example environment in which several aspects of the present disclosure may be implemented.

FIG. 1 is a block diagram representing an example environment in which several aspects of the present disclosure can be implemented. The example environment is shown containing only representative devices and systems for illustration. However, real world environments may contain more or fewer systems. FIG. 1 is shown containing access point (AP) 110, wireless stations (STA) 120 and 130, embedded device 140 and internet 150. AP 110 and STAs 120 and 130 are generically referred to herein as wireless devices. STA 120 is shown containing antenna 125. AP 110 and STA 130 are also shown containing antennas, but not numbered.

Although, only two STAs are shown, the environment of FIG. 1 may contain more or less than two STAs also. Further, in the description below, the devices and the environment are described as operating consistent with Wireless Local Area Network (WLAN) according to IEEE 802.11 standard(s), merely for illustration. Implementations in other environments are also contemplated to be within the scope and spirit of various aspects of the present invention.

Internet 150 extends the connectivity of wireless devices 120 and 130 to various systems (not shown) connected to, or part of, internet 150. Internet 150 is shown connected to access point (AP) 110 through a wired path 115. STAs 120 and 130 may access devices/systems in internet 150 via AP 110. Internet 150 may be implemented using protocols such as IP. In general, in IP environments, an IP packet is used as a basic unit of transport, with the source address being set to the IP address assigned to the source system from which the packet originates and the destination address set to the IP address of the destination system to which the packet is to be eventually delivered. The IP packet is encapsulated in the payload of layer-2 packets when being transported across WLANs.

An IP packet is said to be directed to a destination system when the destination IP address of the packet is set to the IP address of the destination system, such that the packet is eventually delivered to the destination system. When the packet contains content such as port numbers, which specifies the destination application, the packet may be said to be directed to such application as well. The destination system may be required to keep the corresponding port numbers available/open, and process the packets with the corresponding destination ports.

Block 190, shown containing AP 110 and STAs 120 and 130, represents a basic service set (BSS) of an infrastructure mode wireless network consistent with the IEEE 802.11 standard. Although only a single BSS is shown and described, other environments may include more than one BSS, with the BSSs being interconnected to form an extended service set (ESS) consistent with IEEE 802.11 standards, as is well known.

Each of STAs 120 and 130 represent end devices of wireless network (BSS 190), and may be the source or destination (i.e., consumer) of data packets (data units). Each STA may be assumed to be providing connectivity to a corresponding embedded device, though only STA 120 is shown providing wireless connectivity for embedded device 140.

AP 110 represents a switching device, and forwards data packets received from one STA to the other STA. AP 110 also forwards data packets received from any of the STAs and destined for a device(s) in internet 150. AP 110 may receive data packets from internet 150 and forward the data packets to the corresponding destination STA(s). Further, AP 110 may perform various other operations consistent with IEEE 802.11 (WLAN) standards, as is well known in the relevant arts.

Embedded device 140 is shown connected to STA 120 via wired path 124, and may correspond to, for example, a microwave oven or washing machine. Embedded device 140 may send or receive data from devices in BSS 190 or internet 150 via AP 110 and STA 120. Embedded device 140 may have only limited processing power and/or memory, and thus relies on STA 120 to provide wireless network connectivity to receive and send data. It is noted here that STA 120 and embedded device 140 are shown as separate devices merely for illustration. However, embedded device 140 and STA 120 can be combined to form a single integrated wireless device.

It may be desirable to reduce power consumption in STA 120 when providing network connectivity for embedded device 140. The reduction may be attained by placing in power-savings mode, (at least a portion of) the wireless receiver based on various conditions in accordance with features of the present disclosure. In particular, the wireless receiver is placed in power savings mode upon occurrence of a first condition. Upon occurrence of a second condition, the receiver is placed in active mode to continue retrieval of data for the embedded device, as described below with examples.

3. Example One

Figure 2:
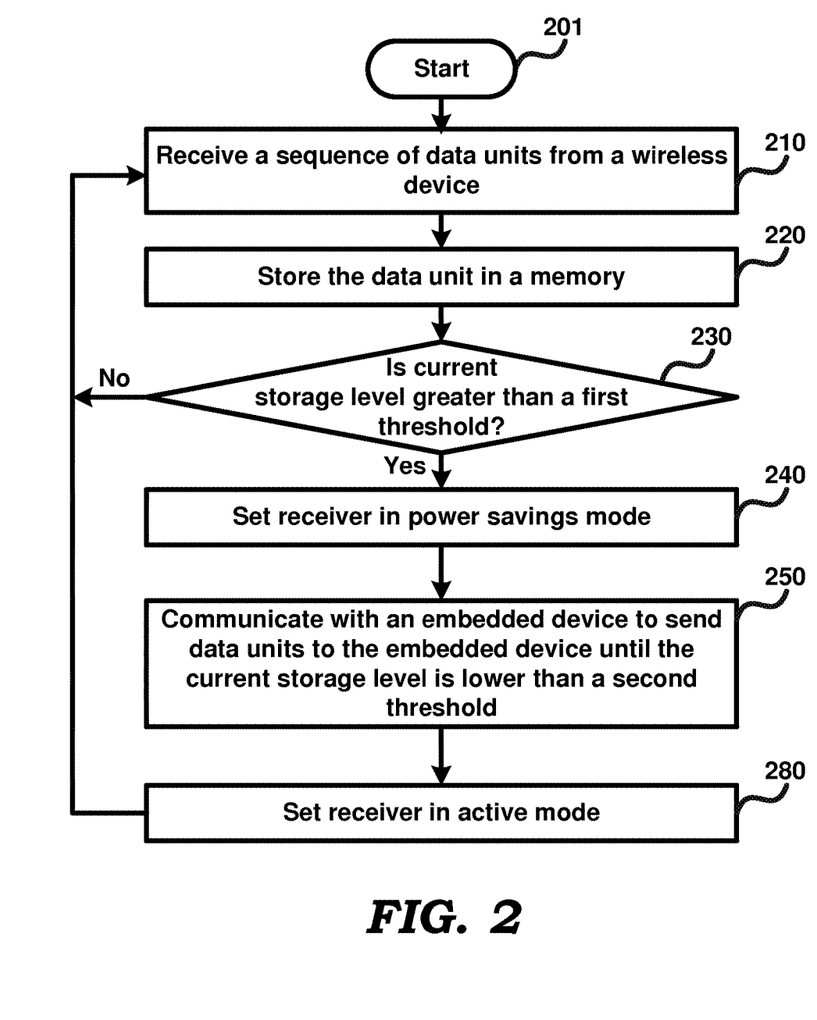
FIG. 2 is a flow chart illustrating the manner in which power consumption in a wireless device providing network connectivity to an embedded device, is reduced in an embodiment.

FIG. 2 is a flow chart illustrating the manner in which power consumption in a wireless station providing network connectivity for an embedded device, in an embodiment of the present disclosure. Merely for illustration, the flowchart is described below as being performed in STA 120 when STA 120 receives, from AP 110, data units meant for use/consumption by embedded device 140. However, the features can be implemented in STA 130, as well as in other systems and environments without departing from the scope and spirit of various aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 201, in which control immediately passes to step 210.

In step 210, STA 120 receives a sequence of data units from AP 110, the data units being meant for use/consumption (processing) by embedded device 140. The data units may have originated at STA 130 or a device in internet 150. A receiver in STA 120 designed to operate according to IEEE 802.11 (WLAN) standards to receive the sequence of data units may be maintained in an active state, or at least switched to the active state (powered-ON state), to receive the data unit. Control then passes to step 220.

In step 220, STA 120 stores the data units in a memory contained in STA 120. Control then passes to step 230.

In step 230, STA 120 determines if a current storage level in the memory is greater than a first threshold. The term "current storage level" refers to the number of memory locations (bytes, words, etc.) that 'currently' (at that time instance) have valid data units (including the data units received in step 210) stored in them, which are yet to be transferred to embedded device 140. The first threshold is computed large enough such that there is sufficient data in the memory for the consumption of embedded device 140 over a first future duration. The threshold may be computed taking into account how fast the embedded device is expected to consume the data, and how soon data units are expected to be received upon the receive being again placed in active mode, as described below in step 280.

If the current storage level is not greater than the first threshold, control passes to step 210, and STA 120 receives another data unit from the external device, and the corresponding steps may be repeated till the current storage level exceeds the first threshold. If the current storage level is greater than (exceeds) the first threshold, control passes to step 240.

In step 240, STA 120 sets the receiver (used to receive the data units, as in step 210) to power savings mode. As used herein, the term 'receiver' refers to those hardware portions of STA 120 (excluding antenna 595 of FIG. 5, described below) that are used to receive a WLAN signal and demodulate the WLAN signal to extract data/control information in the WLAN signal. Depending on the specific implementation, the receiver may include circuitry to perform down-conversion of a WLAN RF signal, analog-to-digital conversion, sampling, baseband processing, etc, as is well known in the relevant arts.

When set to power savings mode, power to some or all of the circuitry (hardware portions) of the receiver is turned OFF. In some implementations of STA 120, some of the receiver's operations (e.g., some or all baseband operations) may be performed by a processing block. In such implementations, the corresponding portion of the processing block may also be powered down, and/or the corresponding software instructions may not be executed. Control then passes to step 250.

In step 250, STA 120 communicates with embedded device 140 to send data units (stored in the memory) to embedded device 140 until the current storage level is lower than a second threshold. The second threshold is computed or chosen such that current storage level falling below the second threshold represents a condition (second condition) indicating that there is insufficient data in the memory for the consumption of embedded device 140 for a second future duration. The second future duration may be computed taking into account the rate at which embedded device 140 can consume the data units so as to ensure that embedded device 140 receives data units with a (desired) continuity and rate, as suitable in the corresponding environment. Control then passes to step 280.

In step 280, STA 120 sets the receiver in active mode. Active mode refers to an operating mode, in which the RF as well as baseband portions are powered ON (with clock gating to baseband removed if earlier applied), and thus enabled to receive and process WLAN signals, and extract data/information from the WLAN signals. Control then passes to step 210, and the corresponding steps of the flowchart of FIG. 2 may be repeated.

It is noted here, the specific sequence of the steps described above are provided by way of illustration only. In operation, two or more of the steps may be concurrently performed in STA 120. For example, the combination of steps 210 and 220 may be executed by a first execution thread, the combination of steps 230, 240 and 280 may be executed by a second execution thread, while step 250 may be executed as a third execution thread. The first execution thread, the second execution thread and the third execution thread may be executed concurrently.

Peripheral device 140, being an embedded device with limited processing power and/or memory, may not be able to consume or locally store (within peripheral device 140) the data units received from STA 120, resulting in the current storage level in the memory of STA 120 to exceed the first threshold. It may be appreciated that using the current storage level of the memory in STA 120 as a measure to control reception of data units by operating the receiver in active mode, and to stop reception of data units by operating the receiver in power savings mode, may enable reduction of power consumption in STA 120, as well as avoiding over-flow of data in the memory and consequent requirement of retransmission of data packets from AP 110 (based on request for such retransmission from STA 120 due to data overflow in the memory of STA 120).

As an example, embedded device 140 may represent a printer. STA 120 may download a sequence of data units to be sent to embedded device 140 and printed. Embedded device 140 may have limited memory to store (buffer) the data units. Further, the rate at which embedded device 140 consumes the data units in printing may be slower than the rate at which the data units are received at STA 120 from AP 110. Therefore, operating the WLAN receiver of STA 120 as described above with respect to the steps of flowchart of FIG. 2 may provide the benefits noted above.

In alternative embodiments of the present disclosure, the transitions to power savings mode and back to active mode (and therefore the first condition and second condition noted above) are indicated to STA 120 by embedded device 140 through corresponding express indication(s), rather than being based on the current storage levels in the memory in STA 120, as illustrated below with respect to corresponding examples.

4. Further Examples

Figure 6:
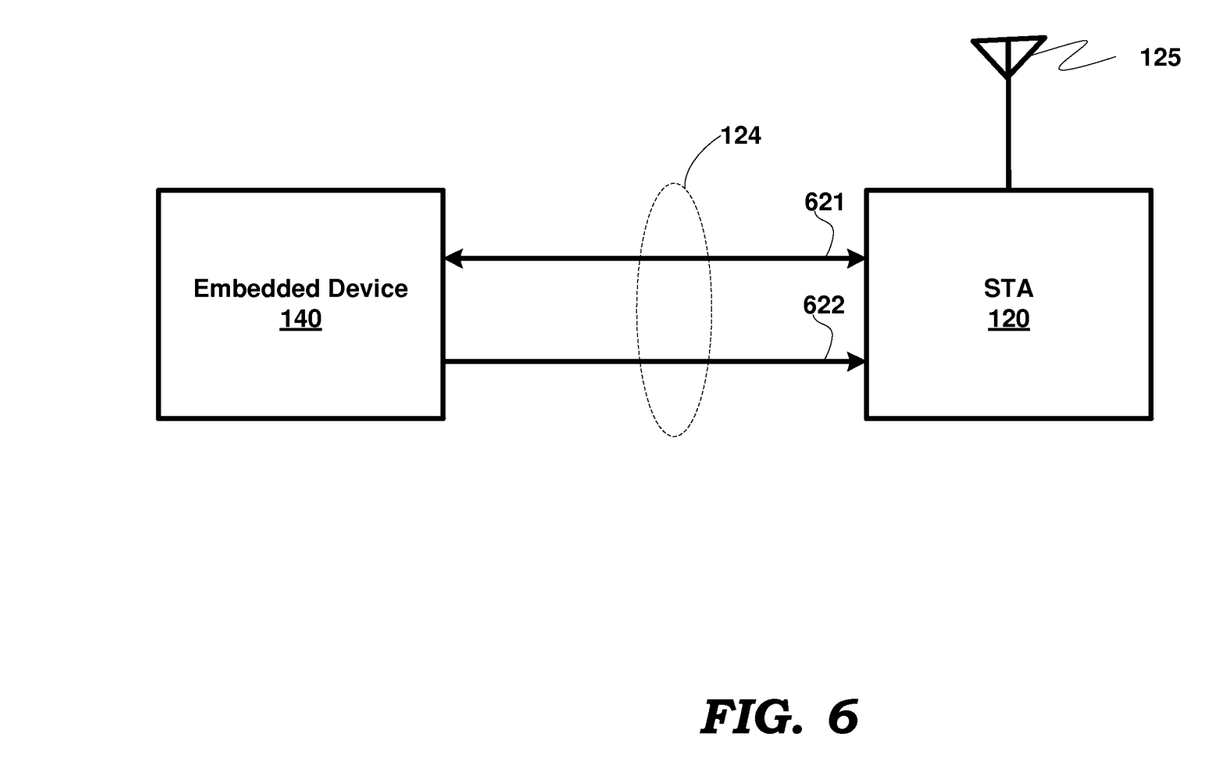
FIG. 6 is a block diagram showing the interconnections between a wireless station and an embedded device, in an embodiment.

FIG. 6 shows embedded device 140 and STA 120 connected via path 124, which is shown containing paths 621 and 622. Path 621 represents a path on which STA 120 forwards data units to embedded device 140. In an embodiment, path 621 is a serial data path according to the Serial Peripheral Interface (SPI) specifications. Path 622 represents a control path on which embedded device 140 indicates to STA 120 whether to place its receiver in power savings mode or active mode. Assertion (active binary level) of signal 622 indicates to STA 120 that STA 120 should place its receiver in power savings mode, while de-assertion (inactive binary level) of signal 622 indicates to STA 120 that STA 120 should place its receiver in the active mode.

When embedded device 140 is not currently ready to receive any more data units (or has sufficient data units for processing in a short future duration) on path 621, embedded device 140 asserts signal 622. Assertion of signal 622 corresponds to the first condition (noted above) being satisfied. In response, STA 120 sets the receiver in power savings mode, while buffering any data units already received, but not yet transferred to embedded device 140. STA 120 may complete receiving data units already requested and buffer the corresponding data units.

When embedded device 140 is ready to accept more data units (for example after consumption of a corresponding number of data units received from STA 120), embedded device 140 de-asserts signal 622. In response to the de-assertion of signal 622, STA 120 sets its receiver in active mode. De-assertion of signal 622 corresponds to the second condition (noted above) being satisfied. The data units already available due to buffering may continue to be transferred, while new data units are received from the wireless network.

In yet another embodiment, embedded device 140 indicates to STA 120, via a corresponding set of signals (not shown, but which could be the SPI serial link 621 when link 621 is implemented in bidirectional mode), the exact amount of data units (either bytes or any higher units of granularity) that embedded device 140 is ready to (or can) receive. In response to receipt of the indication (representing the second condition), STA 120 places its receiver in the active mode to receive the specified amount of data (from AP 110) indicated by embedded device 140. STA 120 may forward the received data units to embedded device 140 as the data units are received. Completion of receipt by STA 120 of the specified number of data units from AP 110 represents the first condition being satisfied. STA 120 sets its receiver to power savings mode.

When embedded device 140 is again ready to accept more data units, embedded device 140 may again indicate to STA 120 the exact number of fresh data units, and STA 120 may process the request in a similar way as before. The indication to STA 120 represents the second condition.

In yet another embodiment, embedded device 140 may indicate to STA 120 that STA 120 is to set its receiver in active mode at certain time intervals (regular or irregular) to receive data units (meant for use by embedded device 140) from AP 110. Thus, for example, embedded device 140 may indicate to STA 120 that STA 120 should set its receiver in active mode every five seconds for a duration of one second to receive data units from AP 110. STA 120 accordingly sets its receiver in active mode for a duration of one second once every five seconds (the receiver being set in power savings mode for the remaining period of four seconds) to receive data units from AP 110. STA 120 forwards the data units received in each one-second interval to embedded device 140.

In such an embodiment, the start of the first second of each five-second interval represents the second condition being satisfied, while the start of the second second of each five-second interval represents the first condition being satisfied. The second future duration corresponds to an arbitrary length of time starting at the first second and ending at the end of the second second for which embedded device 140 would have no data (or insufficient data) to consume. The first future duration corresponds to the length of time starting at the beginning of the second second and ending at the end of the fifth second.

Operations of the corresponding devices according to the examples provided above are further illustrated below with respect to a timing diagram. However, the implementation details of a wireless station in an embodiment of the present disclosure are provided next.

5. Example Implementation

Figure 5:
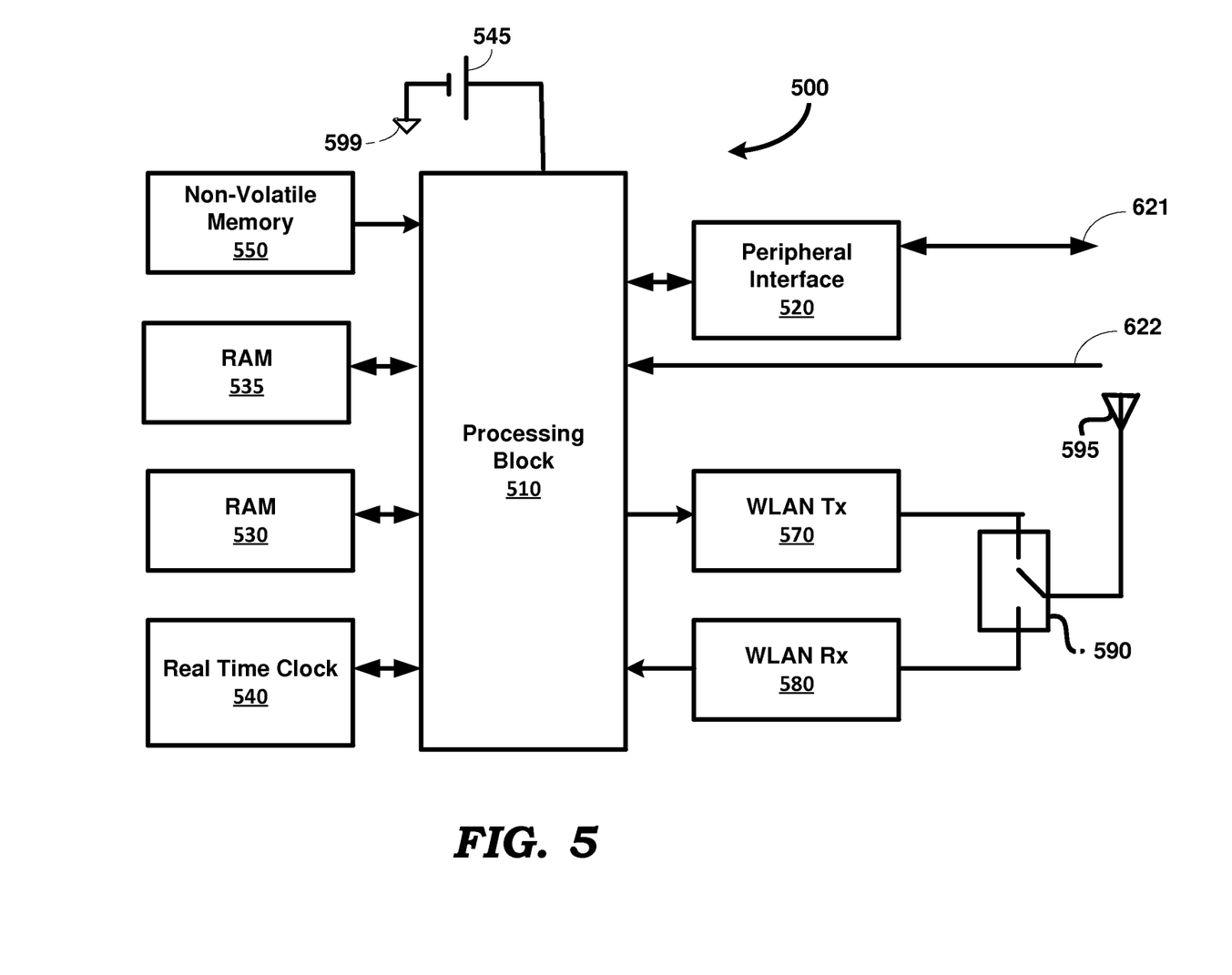
FIG. 5 is a block diagram illustrating the implementation details of a wireless station in an embodiment.

FIG. 5 is a block diagram showing the implementation details of a wireless station in an embodiment of the present disclosure. Wireless station 500 may correspond to any of STAs 120 and 130 of FIG. 1. However, in the following description, it is assumed that wireless station 500 corresponds to STA 120. Accordingly, STA 120 is shown containing processing block 510, peripheral interface 520, random access memory (RAM) 530, random access memory (RAM) 535, real-time clock (RTC) 540, battery 545, non-volatile memory 550, WLAN transmitter (Tx) 570, WLAN receiver (Rx) 580, switch 590, and antenna 595. The whole of STA 120 may be implemented as a system-on-chip (SoC), except for battery 545 and antenna 595. Alternatively, the blocks of FIG. 5 may be implemented on separate integrated circuits (IC).

Battery 545 provides power for operation of STA 120, and may be connected to the various blocks shown in FIG. 5. Although not shown in FIG. 5, STA 120 contains corresponding circuitry (such as power switches, for example) for selectively powering-ON and powering-OFF WLAN Rx 580, and (optionally) WLAN Tx 570 also. RTC 540 operates as a clock, and provides the 'current' time to processing block 510. Terminal 599 represents a ground terminal.

Antenna 595 operates to receive from, and transmit to, a wireless medium, corresponding wireless signals according to IEEE 802.11 (WLAN) standards. Switch 590 may be controlled by processing block 510 (connection not shown) to connect antenna 595 to one of blocks 570 and 580 as desired, depending on whether transmission or reception of WLAN signals is required. Switch 590, antenna 595 and the corresponding connections of FIG. 5 are shown merely by way of illustration. Instead of a single antenna 595, separate antennas, one for transmission and another for reception of WLAN signals, can also be used. Various other techniques, well known in the relevant arts, can also be used instead.

WLAN Tx 570 receives data to be transmitted according to WLAN standards from processing block 510, generates a modulated radio frequency (RF) signal according to IEEE 802.11 standards, and transmits the RF signal via switch 590 and antenna 595. WLAN Tx 570 may contain RF and baseband circuitry for generating and transmitting WLAN signals, as well as for medium access operations. Alternatively, WLAN Tx 570 may contain only the RF circuitry, with processing block 510 performing the baseband and medium access operations (in conjunction with the RF circuitry).

WLAN Rx 580 represents a receiver that receives an RF signal (according to IEEE 802.11/WLAN standards) bearing data and/or control information via switch 590, and antenna 595, demodulates the RF signal, and provides the extracted data or control information to processing block 510. WLAN Rx 580 may be implemented according to one of several well known approaches. Thus, for example, WLAN Rx 580 may contain RF as well as baseband processing circuitry for processing a WLAN signal. Alternatively, WLAN Rx 580 may contain only the RF circuitry, with processing block 510 performing the baseband operations in conjunction with the RF circuitry. WLAN Rx 580 may selectively be powered OFF and powered ON by controlling (by processing block 510, for example) corresponding circuitry, such as power switches (not shown), connecting WLAN Rx 580 to battery 545. Further, when WLAN Rx 580 includes baseband processing circuitry, such circuitry may also be selectively powered OFF and powered ON. Alternatively, the master clock provided for operation of such baseband circuitry may be capable of being gated OFF and gated ON by corresponding circuitry.

Peripheral interface 520 receives, from processing block 510, data units (e.g., characters to be printed by embedded device 140) that have been received by STA 120 from an external device (as described above with respect to step 210 of FIG. 2) via AP 110, and stored (buffered) in RAM 535. Peripheral interface 520 may process the data units (e.g., perform format conversion according to the interface format required by embedded device 140), and provides the formatted data on path 621. In the corresponding embodiments noted above, peripheral interface 520 receives on path 621 the exact number of data units to be received from AP 110 by STA 120, indication of the time intervals at which data is to be received from AP 110 by STA 120, etc.

Non-volatile memory 550 is a non-transitory machine readable medium, and stores instructions, which when executed by processing block 510, causes STA 120 to operate as described above. In particular, the instructions enable STA 120 to operate as described with respect to the flowchart of FIG. 2, when implemented correspondingly.

RAM 530 is a volatile random access memory, and may be used for storing instructions and data. RAM 535 is a volatile random access memory is used for storing data units received from an external device via AP 110. Processing block 510 may retrieve such data units and forward the data units to embedded device 140, as described with respect to the flowchart of FIG. 2. A separate memory (RAM 535) is noted as being used for storing data units received from an external device, merely to simplify description. However, such data units can also be stored in RAM 530 or some other type of memory (e.g., Flash). When RAM 530 is used, one set of contiguous portions of memory locations of RAM 530 may be used for storing the received data units, while another set of contiguous portions of memory locations of RAM 530 may be used for storing instructions and data.

Processing block 510 (or processor in general) may contain multiple processing units internally, with each processing unit potentially being designed for a specific task. Alternatively, processing block 510 may contain only a single general-purpose processing unit. Processing block 510 may execute instructions stored in non-volatile memory 550 or RAM 530 to enable STA 120 to operate according to several aspects of the present disclosure, described above in detail.

Processing block 510 may evaluate the occurrence of the first condition and the second condition noted above, and issue corresponding control signals to selectively place receiver (580 and possibly baseband processing in 510) in power savings mode or active mode. Processing block 510 may also issue control signals to signals selectively power-ON/power-OFF WLAN Tx 570 also. In some implementations of STA 120, processing block 510 may perform some operations (e.g., some or all baseband operations) related to receipt and demodulation of WLAN signals, as well as other operations such as decryption, error corrections, etc. In such implementations, the corresponding portion(s) of processing block 510 may be powered down, and/or the corresponding software instructions may not be executed in the power savings mode. In such implementations, the term 'receiver' as used herein refers to the combination WLAN Rx 580 and the corresponding portion(s) of processing block 510. When the receiver is in power savings mode, discharge of battery 545 may be reduced, thereby reducing power consumption.

Processing block 510 may retrieve data units stored in RAM 535, and forward the data units to peripheral interface 520. A multi-processing/multi-thread environment may be implemented using non-volatile memory 550, RAM 530, and processing block 510 and corresponding software instructions, to perform the steps of the flowchart of FIG. 2.

RAM 530 and non-volatile memory 550 (which may be implemented in the form of read-only memory/ROM/Flash) constitute computer program products or machine (or computer) readable medium, which are means for providing instructions to processing block 510. Thus, such medium can be in the form of removable (floppy, CDs, tape, etc.) or non-removable (hard drive, etc.) medium. Processing block 510 may retrieve the instructions, and execute the instructions to provide several features of the present disclosure.

The description is continued with respect to a timing diagram illustrating the manner in which power is reduced in the receiver of STA 120, in an embodiment.

6. Timing Diagram

Figure 4:
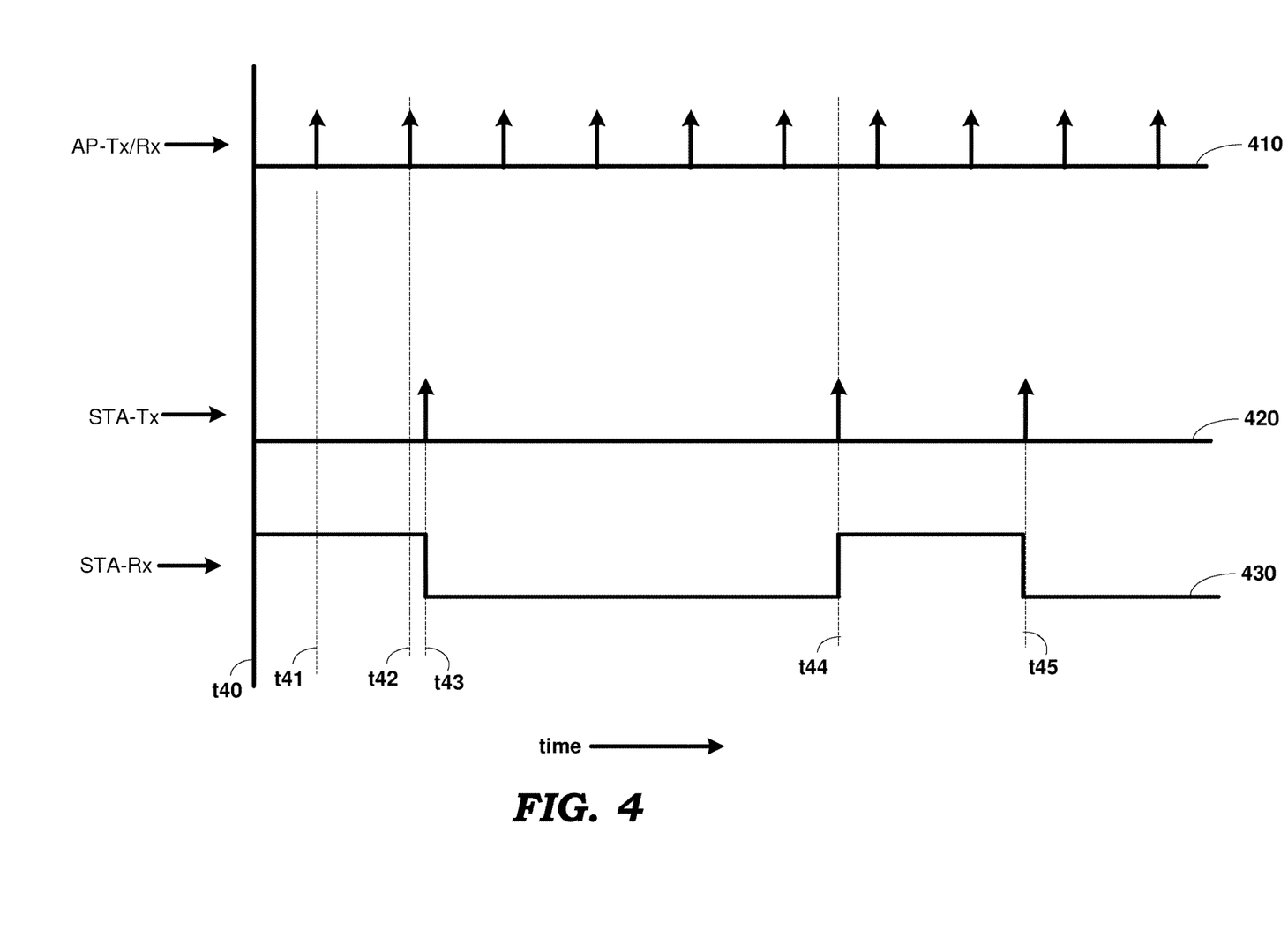
FIG. 4 is a timing diagram illustrating the interaction between a wireless station and an access point in reducing power consumption in the wireless station, in an embodiment.

FIG. 4 is a timing diagram used to illustrate the manner in which power consumption in a STA is reduced, in an embodiment of the present disclosure. The waveforms of FIG. 4 may not be to scale. Waveform 410 (AP-Tx/Rx) represents transmissions and receptions of WLAN signals by/at AP 110 (of FIG. 1). Waveform 420 (STA-Tx) represents transmissions of WLAN signals from WLAN Tx 570. Waveform 430 represents the operational state (active mode and power savings modes) of WLAN Rx 580.

It is assumed in the following description that STA 120 has associated and authenticated with AP 110 sometime prior to time instance t40. Also, it is assumed that STA 120 has synchronized its local clock (maintained in RTC 540) with a master clock maintained in AP 110. Further, it is assumed that STA 120 has negotiated a listen interval in cooperation with AP 110, also prior to t40. The listen interval represents the maximum duration for which AP 110 can locally (within AP 110) buffer unicast data destined for STA 120.

In a typical operating scenario, once a STA has set its receiver to power savings mode, the STA powers ON the receiver at least once before the expiry of the listen interval, to ensure that unicast data destined for the STA is not lost. However, according to an aspect of the present invention, the power save mode duration and active mode duration (as well as their start and end time instances) of WLAN Rx 580 are determined based respectively on whether the first condition and the second condition are satisfied.

The vertical arrows of waveform 410 represent start of beacon transmissions from AP 110. Thus, the interval t41-t42 represents a beacon interval of AP 110. In the interval t40-t43, WLAN Rx 580 is maintained in the active mode (power ON state), and receives data units (step 210) from AP 110, the data units being meant for use/consumption of embedded device 140. STA 120 stores the data units (step 220) in RAM 535. Concurrently with the receiving and storing of the data units, processing block 510 (in conjunction with peripheral interface 520) sends the data units to embedded device 140 (step 250). Thus, processing block 510 may retrieve the data units from RAM 535, and forward the data units to peripheral interface 520, which may in turn transmit the data units to embedded device 140.

Concurrently with the operations of receiving the data units, storing the data units, and consuming the data units, processing block 510 determines (at corresponding intervals) if the current storage level in RAM 535 is greater than a first threshold.

Figure 3A:
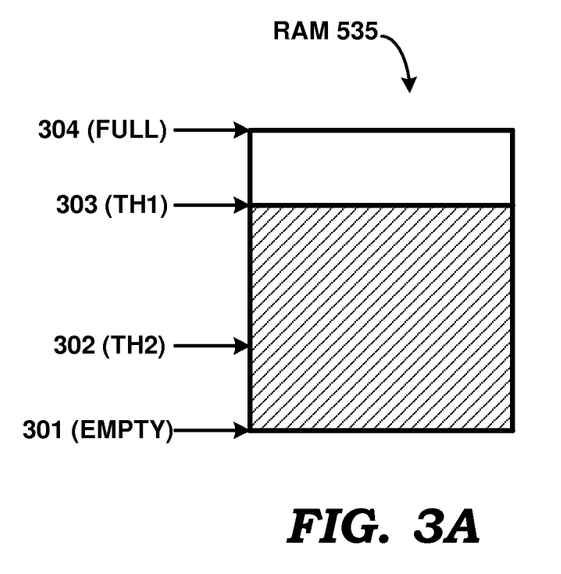
FIG. 3A is a diagram showing the state of a memory when the storage level in the memory equals a first threshold, in an embodiment.

FIG. 3A is a diagram depicting RAM 535, and the current storage level in RAM 535. As shown there, level 301 indicates a zero/empty storage level (no data currently stored), and level 304 indicates full storage level. The hashed part of the block depicting RAM 535 indicates the current storage level, which is shown in FIG. 3A as equaling a first threshold TH1 (303). Thus, if a current iteration of steps 210 and 220 leads to the current storage level being determined as greater than TH1, STA 120 sets WLAN Rx 580 in the power savings mode (step 240). With respect to FIG. 4, processing block 510 makes a determination that the current storage level in RAM 535 exceeds THI at time instance t43, therefore satisfying the first condition. The first future time instance may correspond to some portion of the time between t43 and t44 required by embedded device 140 to consume the data units sent by STA 120. The specific value of THI (as a percentage of the full storage level 304) may be preconfigured by a user, based for example on the processing speed and memory availability in embedded device 140.

At t43, STA 120 sets WLAN Rx 580 in power savings mode. At (or slightly later than t43), WLAN Tx 570 (under control from processing block 510) transmits a NULL frame (indicated by vertical arrow of waveform 420 at t43) to AP 110, with the power management (PM) bit in the NULL frame set to a value one, indicating that STA 120 is to set (or has set) WLAN Rx 580 in power savings mode. In response to receipt of the NULL frame, AP 110 commences buffering unicast data destined for STA 120.

In the interval t43-t44, AP 110 buffers data units destined for STA 120 and for consumption/use by embedded device 140. In the interval t43-t44 STA 120 (or processing block 510 in conjunction with peripheral interface block 520) transmits data stored in RAM 535 to embedded device 140, until the storage level falls below a second threshold (TH2) (step 250), therefore satisfying the second condition.

Figure 3B:
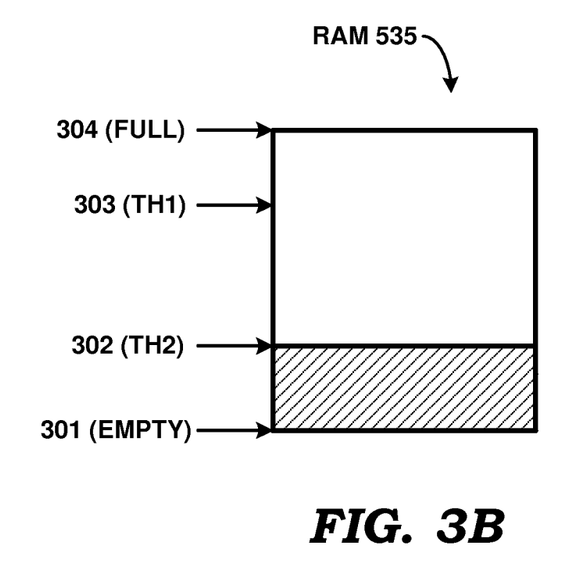
FIG. 3B is a diagram showing the state of a memory when the storage level in the memory equals a second threshold, in an embodiment.

FIG. 3B shows a state of RAM 535, in which the current storage level equals TH2. Thus, when a next data unit is transmitted by the operation of step 250, the current storage level would fall below TH2, and STA 120 sets WLAN Rx 580 in the active mode (step 280). The specific value of TH2 (as a percentage of the full storage level 304) may be preconfigured by a user, based for example on the processing speed and memory availability in embedded device 140.

At (or slightly later than t44), STA 120 sets WLAN Rx 580 in the active mode, and WLAN Tx 570 transmits a NULL frame (indicated by vertical arrow of waveform 420 at t44) to AP 110, with the power management (PM) bit in the NULL frame being set to a value zero, indicating that STA 120 has set WLAN Rx 580 in the active mode and that AP 110 need not buffer data destined for STA 120.

In response to receipt of the NULL frame with PM bit set to value zero AP 110 transmits the data units (buffered in AP 110 in the interval t43-t44) to STA 120. The data units may have been received by AP 110 in the interval t43-t44 from STA 130 or from a device in internet 150.

In the interval t44-t45, STA 120 receives the data units transmitted by AP 110 via WLAN Rx 580 (now in active mode), and stores the data units in RAM 535. It is noted that STA 120 may concurrently consume the data units.

At, or slightly earlier than t45, it is assumed that the current storage level in RAM 530 again exceeds TH1. In response, STA 120 sets WLAN Rx 580 to power savings mode, and the operations illustrated in the timing diagram of FIG. 4 may repeat.

In an embodiment, a circular buffer is maintained in RAM 535 for storing received data unit. A corresponding processing thread, executed by processing block 510, determines at corresponding (frequent) intervals the current storage level of the circular buffer (step 230), and performs the steps of 240 and 280 as appropriate. A second separate processing thread may be used for performing steps 210 and 220, while a third separate processing thread may be used for performing step 250. The three processing threads may execute concurrently in a multi-thread/multi-processing environment using processing block 510 and corresponding software instructions.

While the timing diagram is illustrated with respect to example of the current storage level exceeding the first threshold or falling below the second threshold. It may easily be appreciated that the same or similar timing diagram can also be used to illustrate operation according to the other embodiments as well.

For example, in the embodiment in which embedded device 140 asserts/de-asserts signal to control the operation state (power savings and active modes) of the receiver of STA 120, such assertion of signal 622 may occur at t43. In response STA 120 may place its receiver in power savings mode. STA 120 may complete receiving data units already requested and buffer the corresponding data units. When embedded device 140 is ready to accept more data, embedded device 140 de-asserts signal 622 at t44. In response, STA 120 places its receiver in active mode and downloads data from AP 110 (or the wireless network in general), which may subsequently be forwarded to embedded device 140.

In the embodiment in which embedded device indicates to STA 120 the exact number of data units to be downloaded from AP 110, the occurrence of such instruction may correspond to t44. STA 120 then places its receiver in active mode to be downloaded the requested number of data units from AP 110. The completion of the download may correspond to t45, at which time STA 120 places its receiver in the power savings mode.

7. Conclusion

References throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A system comprising:
   an embedded device;
   a wireless station connected to said embedded device by a wired path, said wireless station being part of a wireless network, said wireless station comprising a receiver and a memory, the wireless station being operable to:
   receive a sequence of data units from a wireless device in said wireless network, the receiver of said wireless station being used to perform said receiving;
   transmit the sequence of data units from the wireless device to the embedded device;
   upon receipt of an assertion of an express indication transmitted from the embedded device to place the receiver in a power savings mode, set said receiver in a the power savings mode; and
   upon receipt of a de-assertion of the express indication transmitted from the embedded device to place the receiver in an active mode, set said receiver in the active mode,
   wherein said embedded device asserts the express indication based on an amount of data units the embedded device determines it is able to receive, and said embedded device de-asserts the express indication when the embedded device has received the amount of data units,
   wherein said embedded device provides respective active and power-saving durations,
   wherein said receiver is placed in said active mode in said active durations and in said power-savings mode in said power-savings durations,
   wherein the active durations are irregular.

2. The system of claim 1, wherein said asserting is received on a first wired path, and data is transferred to said embedded device on a second wired path, wherein said first wired path and said second wired path are contained in said wired path.

3. The system of claim 1, wherein the assertion of the express indication includes a count of the amount of data units the embedded device determines it is able to receive.

4. The system of claim 1, wherein the respective active and power-savings durations are specified in the form of a period of time, wherein said period of time contains a first time duration specifying said active durations and a second time duration specifying said power-saving durations.

5. A method of operating a wireless station of a wireless network, wherein said wireless station comprises a receiver and a memory, the wireless station and is connected to an embedded device by a wired path, said method being performed by said wireless station, said method comprising:
 receive a sequence of data units from a wireless device in said wireless network, the receiver of said wireless station being used to perform said receiving;
 transmit the sequence of data units from the wireless device to the embedded device;
 upon receipt of an assertion of an express indication transmitted from the embedded device to place the receiver in a power savings mode, set said receiver in the power savings mode; and
 upon receipt of a de-assertion of the express indication transmitted from the embedded device to place the receiver in an active mode, set said receiver in the active mode,
 wherein said embedded device asserts the express indication based on an amount of data units the embedded device determines it is able to receive, and said embedded device de-asserts the express indication when the embedded device has received the amount of data units,
 wherein said embedded device provides respective active and power-saving durations,
 wherein said receiver is placed in said active mode in said active durations and in said power-savings mode in said power-savings durations,
 wherein the active durations are irregular.

6. The method of claim 5, wherein said asserting is received on a first wired path, and data is transferred to said embedded device on a second wired path, wherein said first wired path and said second wired path are contained in said wired path.

7. The method of claim 5, wherein the assertion of the express indication includes a count of the amount of data units the embedded device determines it is able to receive.

8. The method of claim 5, wherein the respective active and power-savings durations are specified in the form of a period of time, wherein said period of time contains a first time duration specifying said active durations and a second time duration specifying said power-saving durations.

9. A non-transitory machine readable medium storing one or more sequences of instructions for operating a wireless station of a wireless network, the wireless station comprising a receiver and a memory, wherein execution of said one or more instructions by one or more processors contained in said wireless station enables said wireless station to perform the actions of:
 receive a sequence of data units from a wireless device in said wireless network, the receiver of said wireless station being used to perform said receiving;
 transmit the sequence of data units from the wireless station to the embedded device;
 upon receipt of an assertion of an express indication transmitted from the embedded device to place the receiver in a power savings mode, set said receiver in the power savings mode; and
 upon receipt of a de-assertion of the express indication transmitted from the embedded device to place the receiver in an active mode, set said receiver in the active mode,
 wherein said embedded device asserts the express indication based on an amount of data units the embedded device determines it is able to receive, and said embedded device de-asserts the express indication when the embedded device has received the amount of data units,
 wherein said embedded device provides respective active and power-saving durations,
 wherein said receiver is placed in said active mode in said active durations and in said power-savings mode in said power-savings durations,
 wherein the active durations are irregular.

* * * * *